United States Patent [19]

Wright et al.

[11] 4,290,932

[45] Sep. 22, 1981

[54] ACRYLIC RESIN-ACRYLIC MICROGEL COMPOSITIONS

[75] Inventors: Howard J. Wright, Kansas City, Mo.; David P. Leonard, Overland Park, Kans.; Roger A. Etzell, Gladstone, Mo.

[73] Assignee: Cook Paint and Varnish Company, Kansas City, Mo.

[21] Appl. No.: 98,115

[22] Filed: Nov. 27, 1979

[51] Int. Cl.³ .............................................. C08L 33/14
[52] U.S. Cl. ...................... 260/29.6 WB; 260/31.4 R; 260/33.4 R; 260/33.6 UA; 260/42.43; 525/198; 525/221; 525/223; 525/228; 525/243
[58] Field of Search ............... 525/198, 221, 223, 228, 525/243; 260/29.6 WB; 260/31.4 R, 33.4 R, 33.6 UA

[56] References Cited

U.S. PATENT DOCUMENTS

| | | | |
|---|---|---|---|
| 3,880,796 | 4/1975 | Christenson et al. | 260/33.6 UA |
| 4,055,607 | 10/1977 | Sullivan et al. | 260/851 |
| 4,075,141 | 2/1978 | Porter et al. | 260/17.2 |

FOREIGN PATENT DOCUMENTS 967051  8/1964  United Kingdom .

*Primary Examiner*—Carman J. Seccuro
*Attorney, Agent, or Firm*—Cushman, Darby & Cushman

[57] ABSTRACT

A method of making an acrylic microgel resin which comprises preparing an aqueous microgel emulsion of an acrylic resin which is crosslinked with a multifunctional crosslinking agent, removing water from the emulsion by coagulation and/or azeotropic distillation with an organic solvent in which the microgel is insoluble and which forms an azeotrope with water, and incorporating the thus dehydrated microgel into an acrylic resin which has been prepared by solution polymerization in organic solvent.

8 Claims, No Drawings

ACRYLIC RESIN-ACRYLIC MICROGEL COMPOSITIONS

The present invention is concerned with acrylic resin compositions containing polymeric microparticles, called "microgels" for convenience, which are particularly useful as resinous, film-forming vehicles for high solids paints.

For present purposes, a "microgel" may be described as a stable dispersion of microparticles (usually 0.05–10 microns in size) composed of a polymer which is crosslinked to the extent that it is insoluble in an organic solvent in which the particles are dispersed.

Microgels of various types have been known for quite a long while but recently a great deal of work has gone into the preparation of such products because they appear to offer a way of obtaining high solids (low solvent) compositions for use in paints or coating compositions. Microgels are currently of particular interest in the industrial paint area where governmental regulations are requiring higher and higher solids coating systems.

As representative of the prior work on microgels, there may be mentioned U.S. Pat. Nos. 3,880,796, 4,025,474, 4,055,607 and 4,075,141; and British Patents 967,051 and 1,538,151. Also of interest are articles by Funke "The Possible Uses of Reactive Microgels in Paint Formulation" JOCCA, 1977, 60, pages 438–445 and by Shashoua et al "Microgel: An Idealized Polymer Molecule", Journal of Polymer Science, Vol. XXXIII, pages 101–117 (1958).

An advantage in using microgels in paint systems is that they make it possible to obtain a higher solids content than would otherwise be possible without concurrently causing an increase in viscosity compared to systems without microgels. Furthermore, the microgels seem to improve pigment orientation. For instance when aluminun flakes are used as the pigment, the microgel appears to make the aluminum flakes lie flat, something which is very difficult to do in known high solids systems. Additionally, it has been noted that microgels can give a remarkably high level of sag resistance when used in high solids coating systems. It is also possible, depending on the type and amount of crosslinker used, to make the microgel particles reactive with the resin or resin-forming materials if included with these materials in a cooking or curing cycle for these other materials, thus providing a convenient means for varying the properties of the resinous coating system or compositions ultimately obtained.

While quite a variety of methods have previously been proposed to make microgels, the present invention is directed towards a new method which is very convenient and advantageous while giving a microgel product that may be effectively used in high solids paint systems to provide coatings of excellent aluminum orientation and sag resistance.

One unique aspect of the invention is that the microgel is prepared by first making an aqueous emulsion of an acrylic resin which is crosslinked with a multifunctional ($\geq 2$) crosslinking agent and then dehydrating the system by azeotropically distilling off the water in the emulsion. The resulting very fine crosslinked resin particles can then be added to a conventional acrylic paint resin in organic solvent solution. Alternatively, the micro emulsion can be dehydrated simultaneously with the preparation or cooking of the acrylic paint resin. In that event, the microgel particles may also react with the acrylic resin or resin components as the resin is being prepared. For example, the microgel as prepared may include unreacted vinyl groups which did not react for some reason (such as rigidity of the crosslinking and resulting steric effects) in the preparation of the microgel. However, the addition of other monomers to the microgel for the purpose of preparing the acrylic paint resin simultaneously with the microgel dehydration may well result in reaction between the vinyl groups of the microgel and acrylic monomers.

The microgel emulsion may be mixed with the preformed paint resin in organic solvent solution and then azeotropically distilled to remove the water from the microgel emulsion.

In a further alternative, the emulsion can be coagulated with organic solvent. The water layer and organic layer may then be separated from each other. Some water may remain in the organic layer, it may be removed by adding sufficient solvent and azeotropically distilling the water.

Broadly described, therefore, the acrylic resin composition of the invention is made up of two essential components which, for ease of reference, may be called (1) the microgel emulsion and (2) the acrylic resin. The combination of these components, within the variants mentioned herein, gives a resin composition which, for ease of reference, is called an acrylic microgel resin.

The microgel emulsion (1) is prepared by the emulsion polymerization in water of a mixture of ethylenically unsaturated monomers, preferably including at least one such monomer which contains a —COOH or —OH group and at least one such monomer which is free from —COOH and —OH groups, and a multifunctional crosslinking agent.

The acrylic resin (2) is prepared by polymerizing two or more ethylenically unsaturated monomers in organic solvent solution. In the preferred embodiment, the microgel emulsion (1) is present during the preparation of the acrylic resin and the acrylic polymerization is carried out at a temperature such that the water of the microgel emulsion is azeotropically distilled. However, as indicated earlier, an alternative involves azeotropically distilling off the water of the microgel emulsion by adding thereto an organic solvent which forms an azeotrope with water but which does not dissolve or swell the microgel solids, after which the completely or partially dehydrated microgel is blended with previously formed acrylic paint resin. Alternatively, as noted, the acrylic resin component (2) is prepared in organic solvent solution and the microgel emulsion component is dehydrated in the presence of the preformed acrylic resin solution. Each embodiment, however, involves preparing an aqueous microgel emulsion containing solid crosslinked polymer particles, azeotropically removing water from the emulsion and combining the microgel polymer with acrylic polymer in organic solution, the acrylic polymer being either preformed or prepared in situ, i.e., in the presence of the microgel polymer.

An alternate method is to coagulate the emulsion with a portion of organic solvent, then separate the layers. The organic layer, a mixture of acrylic emulsion, water and organic solvent, can be substituted for the microgel emulsion and incorporated into acrylic resin component (2).

As noted, the microgel emulsion, according to the invention, is prepared by aqueous polymerization of two or more ethylenically unsaturated monomers, one of which preferably includes an —OH or —COOH group and at least one of which is free from such groups, and a multifunctional crosslinking agent. Typically the monomer containing the —OH or —COOH group is acrylic acid, methacrylic acid, hydroxyethyl acrylate, hydroxypropyl acrylate, hydroxyethyl methacrylate or hydroxypropylmethacrylate. The ethylenically unsaturated monomers which are free from —OH and —COOH groups may be, for example, the alkyl esters of acrylic or methacrylic acid, particularly those having from 1 to 4 carbons in the alkyl, e.g. methyl, ethyl, propyl or butyl acrylate; and methyl, ethyl, propyl or butyl methacrylate. Other suitable monomers include styrene or alpha-methyl styrene.

The crosslinking agent may be any such agent which contains at least two ethylenically unsaturated double bonds and will give a crosslinked polymer in aqueous emulsion polymerization that is insoluble in the organic solvent which is ultimately used to make up the acrylic resin compositions. As examples of suitable crosslinking agents there may be mentioned the following although it is noted that the invention is not limited thereto: ethylene glycol dimethacrylate, tetraethylene glycol dimethacrylate, methylene bisacrylamide, methylene bismethacrylamide, divinyl benzene, vinyl methacrylate, vinyl crotonate, vinyl acrylate, divinyl acetylene, trivinyl benzene, glycerine trimethacrylate, pentaerythritol tetramethacrylate, triallyl cyanurate, divinyl ethane, divinyl sulfide, divinyl sulfone, hexatriene, triethylene glycol dimethacrylate, diallyl cyanamide, glycol diacrylate, ethylene glycol divinyl ether, diallyl phthalate, divinyl dimethyl silane glycerol trivinyl ether, trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tetraethylene glycol dimethacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexacrylate, tripentaerythritol octoacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, 1,3-butanediol diacrylate, 1,3-butanediol dimethacrylate, 1,4-butanediol diitaconate, sorbitol triacrylate, sorbitol tetraacrylate, sorbitol tetramethacrylate, sorbitol pentaacrylate, sorbitol hexacrylate, modified 1,4-butylene diacrylate, 1,6 hexanediol diacrylate, modified trimethylolpropane triacrylate, modified pentaerythritol triacrylate, poly functional isocyanates with hydroxy monomers (isophorone diisocyanate plus hydroxy ethyl acrylate), methacrylated epoxy resin, and the like, and mixtures and prepolymers thereof.

The amount of ethylenically unsaturated monomers used to make up the microgel can be widely varied. Typical amounts will fall in the range of 10-90% by weight of monomer or monomers containing —OH or —COOH groups and 90-10% by weight of monomer or monomers which are free from such groups.

The amount of crosslinking agent that is used is important although this can be varied over a relatively large range. Desirably the amount of crosslinking agent constitutes at least about 0.5% and up to 20% by weight of the total amount of all materials used for the emulsion polymerization. In the normal situation this is roughly equivalent to a range of 5-70%, preferably 8-50%, by weight of the total weight of ethylenically unsaturated nomomers and crosslinking agent.

Conventional emulsifiers or surfactants and initiators for emulsion polymerization are used to prepare the microgel emulsion. Typical emulsifiers (or surfactants) include such anionic alkali metal salts of organic carboxylic acids or soaps, e.g., potassium oleate or stearate. Alkyl sulfates and alkyl- or alkylarylsulfonates may also be used. Preferred for use are the sodium alkyl sulfosuccinamates, e.g., disodium N-octadecyl sulfosuccinamate and sodium diamyl sulfosuccinamate. Advantageously, two or more such surfactants are used together since this seems to give an emulsion of better stability.

Suitable initiators are the free radical yielding peroxides and persalts eg., benzoyl peroxide, lauroyl peroxide, ammonium, potassium or sodium persulfate, etc.

Advantageously the emulsion polymerization is carried out by adding the monomers gradually to heated water containing the emulsifier and initiator. Preferably the system is heated to, for example, 75°-90° C. during the monomer addition and for a short time afterwards although it will be appreciated that the polymerization conditions can be widely varied and will depend on other factors, e.g., the monomers involved. It is, in any case, important to obtain a stable emulsion in which the polymer particles have sizes in the order of about 0.05 to 10 microns.

The aqueous microgel emulsion may be azeotropically distilled using any convenient organic solvent which forms an azeotrope with water but does not dissolve or swell the microgel solids. Typically suitable solvents include cellosolve acetate, butanol, naphtha, mineral spirits and the like. The amount of solvent used can be varied but should be enough to facilitate azeotropic removal of the water. All of the water of the microgel emulsion may be removed or only a portion thereof. Usually at least 50% by weight of the water should be removed.

An additional alternative is to coagulate the emulsion with an organic solvent. The coagulum can be physically separated from a water layer. The coagulated portion can then be dryed further by azeotropic distillation or combined with the solution acrylic.

While the microgel emulsion may be separately subjected to azeotropic distillation, the preference, as noted earlier, is to carry out the distillation either concurrently with the preparation (cook) of the acrylic paint resin or in the presence of the previously prepared acrylic resin. In this way, it is possible, if desired, to effect reaction between the acrylic resin and the microgel polymer particles. This may involve further graft or copolymerization via double bonds remaining in the microgel to the linear acrylic polymer which is formed or being formed.

The acrylic polymer used herein may be made in conventional fashion in organic solvent solution using usual polymerization conditions except for the option of including the microgel emulsion in the reaction mixture and azeotropically removing the microgel water during the acrylic polymer preparation or cook. If the acrylic resin is prepared in the presence of the microgel, the organic solvent which is employed should meet the indicated requirements for azeotropically distilling the water from the microgel emulsion, i.e., the solvent should form an azeotrope with water at the temperature used to prepare or cook the acrylic resin and it should not dissolve or swell the microgel particles. Any of the monomers referred to above in connection with the preparation of the microgel may be used to make the acrylic resin. Preferably the acrylic resin includes an ethylenically unsaturated monomer which contains either an —OH or —COOH group and another such monomer which is free from such groups. Except as indicated, the reaction conditions for the acrylic resin cook, i.e., temperature, monomers, proportions, initiators and temperatures are those conventionally employed in preparing acrylic resins by polymerization in organic solvent solutions.

The amount of microgel solids to acrylic resin solids in the final acrylic resin/microgel composition, whether the microgel is included in the preparation of the acrylic resin or subsequently added thereto, will usually be in the range of 5 to 15% by weight of the total resin solids. Normally the total solids content of the final acrylic resin/microgel composition as used will be in the order of 40–60% by weight. The acrylic resin/microgel composition may be mixed with alkylated melamine-formaldehyde precondensates or polyesters and pigments, e.g., aluminum flake, to provide highly useful paints in coating compositions. As indicated, paints based on the present acrylic resin/microgel preparations with and without aluminum flake, on application and curing, are characterized by the orientation of the pigment and improved sag resistance.

The invention is illustrated by the following examples wherein parts, percentages and ratios are by weight unless otherwise indicated:

EXAMPLE 1

A. MICROGEL EMULSION PREPARATION

| | |
|---|---|
| 3.00% | Aerosol 18* (American Cyanamid) |
| 1.50% | Aerosol AY-65** (American Cyanamid) |
| .25% | Sodium Bicarbonate |
| 40.25% | Deionized Water |
| .25% | Ammonium Persulfate |
| 14.75% | Deionized Water |
| 4.00% | Hydroxypropyl Methacrylate |
| 32.00% | 2-Ethylhexyl Acrylate |
| 4.00% | Divinyl Benzene |

*Disodium N-octadecyl sulfosuccinamate
**Sodium diamyl sulfosuccinamate

To a five liter, three neck reaction flask equipped with a condenser, thermometer and agitator, the Aerosol 18, Aerosol AY-65, sodium bicarbonate and first deionized water are charged. The ammonium persulfate and second deionized water are premixed and added to a small addition funnel. The hydroxypropyl methacrylate, 2-ethylhexyl acrylate and divinyl benzene were premixed and added to a separate addition funnel. The surfactants and water are heated to 87°±2° C. at which time 10% of the ammonium persulfate solution is added. The acrylic monomers are added to the reaction flask continuously over 2½ hours. At the same time, the remaining ammonium persulfate solution is added continuously over 3 hours. The temperature of the reaction is held at 87°±2° C. throughout the monomer add. Thirty minutes after the ammonium persulfate solution is added, the emulsion is cooled to room temperature and discharged.

B. ACRYLIC MICROGEL RESIN PREPARATION

| | |
|---|---|
| 17.67% | n-Butanol |
| 17.67% | Cellosolve Acetate (Union Carbide) |
| 12.32% | Microgel Emulsion |
| .36% | t-Butyl Perbenzoate (50% in Mineral Spirits) |
| 12.69% | Styrene |
| 11.66% | Butyl Methacrylate |
| 2.31% | n-Dodecyl Mercaptan |
| 9.75% | 2-Ethylhexyl Acrylate |
| 11.72% | Hydroxypropyl Methacrylate |
| .99% | Acrylic Acid |
| 2.31% | t-Butyl Perbenzoate (50% in Mineral Spirits) |
| .12% | t-Butyl Perbenzoate (50% in Mineral Spirits) |
| .43 | Cellosolve Acetate |

To a five liter, four neck reaction flask equipped with a condenser, Barrett water trap, thermometer and agitator, the n-butanol, Cellosolve Acetate, microgel emulsion and t-butyl perbenzoate are charged. The styrene, butyl methacrylate and n-dodecyl mercaptan are premixed and added to an addition funnel (Premix I). The 2-ethylhexyl acrylate, hydroxypropyl methacrylate, acrylic acid and second t-butyl perbenzoate are premixed and charged to a second addition funnel (Premix II). The solvents, emulsion and t-butyl perbenzoate are heated to reflux, approximately 95° C. When reflux is obtained, Premix I and II are added simultaneously and continuously over a four hour period of time. During the monomer add, water from the emulsion is continuously removed by azeotropic distillation through the Barrett trap. Immediately following the Premix I and II addition, a mixture of t-butyl perbenzoate and Cellosolve Acetate is added over one hour. The resin is allowed to reflux until all of the theoretical water is removed. The resin is then cooled and filtered. This resin contains 10% microgel based on total resin solids. The physical characteristics of this resin are 58.3% nonvolatiles, U viscosity and 31.7 acid number.

EXAMPLE 2

The monomer ratio of the microgel emulsion in Example 1 is 10/80/10, by weight, hydroxypropyl methacrylate/2-ethylhexyl acrylate/divinyl benzene. Using the same cooking procedures of the emulsion in Example 1, a microgel emulsion is prepared using a monomer ratio of 10/70/20, hydroxypropyl methacrylate/2-ethylhexyl acrylate/divinyl benzene.

A. MICROGEL EMULSION PREPARATION

| | |
|---|---|
| 3.00% | Aerosol 18 |
| 1.50% | Aerosol AY-65 |
| 50.25% | Deionized Water |
| .25% | Sodium Bicarbonate |
| .25% | Ammonium Persulfate |
| 14.75% | Deionized Water |
| 3.00% | Hydroxypropyl Methacrylate |
| 21.00% | 2-Ethylhexyl Acrylate |
| 6.00% | Divinyl benzene |

B. ACRYLIC MICROGEL RESIN PREPARATION

| | |
|---|---|
| 16.3% | n-Butanol |
| 16.3% | Cellosolve Acetate |
| 19.15% | Microgel Emulsion |
| .33% | t-Butyl Perbenzoate (50% in Mineral Spirits) |
| 11.70% | Styrene |
| 10.75% | Butyl Methacrylate |
| 2.15% | n-Dodceyl Mercaptan |
| 8.99% | 2-Ethylhexyl Acrylate |
| 10.81% | Hydroxypropyl Methacrylate |
| .91% | Acrylic Acid |
| 2.13% | t-Butyl Perbenzoate (50% in Mineral Spirits) |
| .11% | t-Butyl Perbenzoate (50% in Mineral Spirits) |
| .37% | Cellosolve Acetate |

The procedure for the preparation of this acrylic microgel resin is the same as stated in Example 1-B. The amount of microgel in the acrylic resin is 10% based on total solids. The physical characteristics of this resin are X-Y viscosity at 58.3 non-volatiles and 30.7 -acid number.

EXAMPLE 3

Using the same surfactants, level and procedure for the microgel emulsion in Example 1-A, an emulsion is prepared with a 10/88/2 monomer ratio of hydroxypropyl methacrylate/methylmethacrylate/divinyl benzene.

The acrylic microgel resin is prepared from the formulation given below:

| | |
|---|---|
| 17.67% | n-Butanol |
| 17.67% | Cellosolve Acetate |
| 12.32% | Microgel Emulsion |
| .36% | t-Butyl Perbenzoate (50% in Mineral Spirits) |
| 12.69% | Styrene |
| 11.66% | Butyl Methacrylate |
| 2.31% | n-Dodecyl Mercaptan |
| 9.75% | 2-Ethylhexyl Acrylate |
| 11.72% | Hydroxypropyl Methacrylate |
| .99% | Acrylic Acid |
| 2.31% | t-Butyl Perbenzoate (50% in Mineral Spirits) |
| .12% | t-Butyl Perbenzoate (50% in Mineral Spirits) |
| .43% | Cellosolve Acetate |

The procedure for the preparation of the acrylic microgel resin is the same as stated in Example 1-B. The amount of microgel in this resin is 10% based on total solids. The physical characteristics of this resin are U-X viscosity at 59.2% non-volatiles and 31.8 acid number.

EXAMPLE 4

An alternate procedure for the acrylic microgel resin preparation as given in Example 2, is to first prepare an acrylic resin solution, then dehydrate the microgel emulsion in the presence of the acrylic resin. The formulation for the acrylic resin is given below:

| Solution Acrylic Resin | |
|---|---|
| 26.3% | Cellosolve Acetate |
| .5% | Cumene Hydroperoxide |
| 19.0% | Styrene |
| 17.4% | Butyl Methacrylate |
| 14.7% | 2-Ethylhexyl Acrylate |
| 17.5% | Hydroxypropyl Methacrylate |
| 1.4% | Acrylic Acid |
| 2.4% | Cumene Hydroperoxide |
| .2% | di-t-Butyl Peroxide |
| .6% | Cellosolve Acetate |

To prepare this resin a five liter reaction flask, equipped with a thermometer condenser and agitator, was charged with the Cellosolve Acetate and first cumene hydroperoxide. This mixture was then brought to reflux, 144°±1° C. A mixture comprising the styrene, butyl methacrylate, 2-ethylhexyl acrylate, hydroxypropyl methacrylate, acrylic acid and the second cumene hydroperoxide, was added continuously over four hours to the refluxing solvent. Immediately after the monomers were added, the mixture of di-t-butyl peroxide and Cellosolve Acetate was added over a period of one hour. The resulting acrylic resin has a Z2 viscosity at 69.4% non-volatiles with a 25.1 acid number.

The acrylic microgel resin was then prepared by blending 66.9 parts acrylic resin, 19.18 parts microgel emulsion (Example 2A) and 13.92 parts n-butanol in a reaction flask and removing the water by azeotropic distillation. The level of microgel in this resin was 10% based on total solids. The physical characteristics were Z3 viscosity at 61.4 non-volatiles and 25.2 acid number.

EXAMPLE 5

Another procedure for incorporating the microgel resin in an acrylic resin is to first dehydrate the emulsion in an organic solvent, then blend it with the acrylic resin.

A five liter reaction flask equipped with a condenser, Barrett trap and agitator was charged with 626 grams of microgel emulsion from Example 2-A. To this was added 950 grams of n-butanol and 50 grams of xylene. The mixture was heated to reflux and the water removed by azeotropic distillation. To the dehydrated microgel is added 2042 grams of acrylic resin from Example 4. The mixture was again heated to reflux and 500 grams of solvent removed. This resin contains 12.2% microgel based on total resin solids. The physical characteristics of this acrylic microgel resin was a J-K viscosity at 56.4% non-volatiles and a 20.4 acid number.

EXAMPLES 6-14

Microgel emulsions I–IV were prepared with materials as shown on Table I. The procedure for the preparation of these emulsions is as follows:

To a five liter, three neck reaction flask, equipped with a condenser, thermometer and agitator, charge the first deionized water and Surfactant 501E. Premix the ammonium persulfate and second portion of deionized water and charge to a small addition funnel. A premix of styrene, butyl methacrylate, 2-ethylhexyl acrylate, hydroxypropyl methacrylate, acrylic acid, trimethylolpropane triacrylate, COPS I, the second 510E and deionized water is prepared and charged to a second addition funnel. This mixture of monomers, water and surfactant, called a preemulsion, was held under constant agitation to maintain a uniform mixture. The contents of the reaction flask was heated to 72°±2° C. at which time 17% of the ammonium persulfate solution was added. The monomer pre-emulsion was then added continuously over 2½ hours. The remaining ammonium persulfate solution was added continuously over 2¾ hours. One half hour after the last addition was made, the emulsion was cooled to 30° C. and discharged from the flask.

Microgel emulsions V–VII were prepared according to the procedure in Example 1-A.

The acrylic microgel resins in Examples 6, 7, 8, 10, 11, 12, and 13, as shown in Table II, were prepared by the same procedure as in Example 1-B.

Example 9 was prepared in a manner similar to Example 1-B except 75% of the theoretical water was removed by azeotropic distillation prior to the addition of acrylic monomers. Example 14 was also prepared like Example 9 except only 50% of the theoretical water was removed prior to the addition of the acrylic monomers.

procedure for preparing these emulsions was the same as shown in Example 1-A.

|  | Example 15 | Example 16 |
|---|---|---|
| Surfactant 501E | 2.450% | 2.500% |
| COPS I | 1.250% | 1.250% |
| Deionized Water | 45.975% | 42.825% |
| Ammonium Persulfate | .175% | .175% |
| Deionized Water | 7.249% | 7.225% |
| Methyl Methacrylate | 13.300% | 14.250% |
| Ethyl Acrylate | 24.453% | 26.225% |
| Acrylic Acid | 1.715% | 1.850% |
| Pentaerythritol Triacrylate | 3.433% | — |
| Diethylene Glycol Diacrylate | — | 3.700% |

TABLE I

|  | I | II | III | IV | V | VI | VII |
|---|---|---|---|---|---|---|---|
| Aerosol 18 |  |  |  |  | 3.00 | 3.00 | 3.00 |
| Aerosol AY-65 |  |  |  |  | 1.50 | 1.50 | 1.50 |
| Sodium Bicarbonate |  |  |  |  | .25 | .25 | .25 |
| Surfactant 501E* | 1.25 | 1.25 | 1.25 | 1.25 |  |  |  |
| Deionized Water | 15.75 | 15.75 | 15.75 | 15.75 | 39.75 | 39.75 | 57.75 |
| Ammonium Persulfate | .25 | .25 | .25 | .25 | .25 | .25 | .25 |
| Deionized Water | 7.25 | 7.25 | 7.25 | 7.25 | 7.25 | 7.25 | 7.25 |
| Sytrene | 12.95 | 12.85 | 12.7 | 12.475 | 11.975 | 11.55 | 6.60 |
| Butyl Methacrylate | 12.025 | 11.875 | 11.75 | 11.525 | 11.050 | 10.55 | 6.00 |
| 2-Ethylhexyl Acrylate | 10.075 | 9.95 | 9.85 | 9.60 | 9.125 | 8.65 | 4.80 |
| Hydroxypropyl Methacrylate | 12.00 | 11.875 | 11.75 | 11.525 | 11.050 | 10.55 | 6.00 |
| Acrylic Acid | .95 | .975 | .975 | .95 | .95 | .95 | .60 |
| Trimethylolpropane Triacrylate |  | .475 | .975 | 1.925 | 3.85 | 5.75 | 6.00 |
| Surfactant 501E | 1.25 | 1.25 | 1.25 | 1.25 |  |  |  |
| COPS I** | 1.25 | 1.25 | 1.25 | 1.25 |  |  |  |
| Deionized Water | 25.00 | 25.00 | 25.00 | 25.00 |  |  |  |
| TOTAL | 100.00 | 100.00 | 100.00 | 100.00 | 100.00 | 100.00 | 100.00 |

*Monoalkyldisodium Sulfosuccinate (American Cyanamid)
**COPS I Proprietary Copolymerizable Surfactants (Alcolac)

TABLE II

|  | Example |  |  |  |  |  |  |  |  |
|---|---|---|---|---|---|---|---|---|---|
|  | 6 | 7 | 8 | 9 | 10 | 11 | 12 | 13 | 14 |
| Butyl Alcohol | 17.60 | 17.56 | 17.56 | 17.60 | 17.60 | 16.99 | 16.38 | 17.60 | 16.538 |
| Cellosolve Acetate | 17.60 | 17.56 | 17.56 | 17.60 | 17.60 | 16.99 | 16.38 | 17.60 | 16.538 |
| Emulsion* | 11.37 | 11.55 | 11.37 | 11.37 | 11.37 | 14.45 | 17.51 | 11.37 | 16.712 |
| tert-Butyl Peroctoate (50% in Mineral Spirits) | .71 | .70 | .70 | .71 | .71 | .68 | .66 | .71 | .665 |
| Styrene | 13.34 | 13.32 | 13.32 | 13.34 | 13.34 | 12.88 | 12.42 | 13.34 | 12.539 |
| Butyl Methacrylane | 11.50 | 11.48 | 11.48 | 11.50 | 11.50 | 11.10 | 10.70 | 11.50 | 10.807 |
| n-Dodecyl Mercaptan | 1.70 | 1.70 | 1.70 | 1.70 | 1.70 | 1.64 | 1.59 | 1.70 | 1.601 |
| 2-Ethylhexyl Acrylate | 10.76 | 10.74 | 10.74 | 10.76 | 10.76 | 10.38 | 10.01 | 10.76 | 10.110 |
| Hydroxyethyl Acrylate | 9.25 | 9.23 | 9.23 | 9.25 | 9.25 | 8.93 | 8.61 | 9.25 | 8.694 |
| Acrylic Acid | .97 | .97 | .97 | .97 | .97 | .94 | .91 | .97 | .915 |
| tert-Butyl Peroctoate (50% in Mineral Spirits) | 4.54 | 4.54 | 4.54 | 4.54 | 4.54 | 4.39 | 4.23 | 4.54 | 4.271 |
| t-Butyl Peroctoate (50% in Mineral Spirits) | .23 | .23 | .23 | .23 | .23 | .22 | .22 | .23 | .218 |
| Cellosolve Acetate | .43 | .43 | .43 | .43 | .43 | .41 | .39 | .43 | .392 |
| Microgel Emulsion From Table I | I | II | III | IV | V | V | V | VI | VII |
| Level of Crosslinking Monomer in Microgel (%) | 0 | 1 | 2 | 4 | 8 | 8 | 8 | 12 | 20 |
| Level of Microgel Emulsion (%) | 11 | 11 | 11 | 11 | 11 | 14 | 17 | 11 | 11 |
| Physical Characteristics |  |  |  |  |  |  |  |  |  |
| Non-volatiles | 56.9 | 56.6 | 57.1 | 56.8 | 57.6 | 57.2 | 58.2 | 56.4 | 57.1 |
| Viscosity | X hy | M | J | I | K | L | R–S | I | H |
| Acid Number | 19.9 | 20.8 | 18.2 | 19.0 | 23.4 | 19.2 | 19.8 | 18.8 | 20.3 |

EXAMPLES 15–16

The following two microgel emulsions were prepared for conversion to acrylic microgel resins. The The acrylic microgel resins were then prepared from the microgel emulsion by the same procedure as stated in Example 1-B. The formulations for these resins are given below.

|  | Example 15 | Example 16 |
|---|---|---|
| n-Butanol | 17.67% | 17.67% |
| Cellosolve Acetate | 17.67% | 17.67% |
| Microgel Emulsion | 12.32% | 12.32% |
| t-Butyl Perbenzoate | .36% | .36% |
| (50% in Mineral Spirits) |  |  |
| Styrene | 13.86% | 12.69% |
| Butyl Methacrylate | 11.66% | 11.66% |
| n-Dodecyl Mercaptan | 2.31% | 2.31% |
| 2-Ethylhexyl Acrylate | 10.92% | 9.75% |
| Hydroxypropyl Methacrylate | — | 11.72% |
| Hydroxyethyl Acrylate | 9.38% | — |
| Acrylic Acid | .99% | .99% |
| t-Butyl Perbenzoate | 2.31% | 2.31% |
| (50% in Mineral Spirits) |  |  |
| Cellosolve Acetate | .43% | .43% |
| t-Butyl Perbenzoate | .12% | .12% |
| (50% in Mineral Spirits) |  |  |
| Physical Characteristics |  |  |
| Non-Volatiles | 59.5% | 61.0% |
| Viscosity | Z1-Z2 | Y-Z |
| Acid Number | 35.1 | 30.8 |

The level of microgel present in each example is 10% based on total solids.

EXAMPLES 17-26

Microgel emulsions I-X were prepared with materials as shown in Table III. Emulsions I, III and IX were prepared according to the procedure used for emulsion I-IV of examples 6-9. Emulsions II, IV-VI and X were prepared in a manner similar to Example 1-A. Emulsion VII was prepared like example 1-A with the following changes. The premix of water and ammonium persulfate was added over four hours. The premix of methyl methacrylate, 29% of the hydroxyethyl acrylate and hexanediol diacrylate was added over 2 hours. The reaction was held at 80°±2° C. for ½ hour, then a second premix of the styrene, butyl methacrylate, 2-ethylhexyl acrylate, 71% of the hydroxyethyl acrylate and the acrylic acid was added over 1½ hours.

The acrylic microgel compositions for examples 17-26 are illustrated in Table IV. Examples 18 and 25 were prepared by the same procedure as in Example 1-B. Examples 17, 19-24, and 26 were prepared by the same procedure as in Example 14.

TABLE III

|  | I | II | III | IV | V | VI | VII | VIII | IX | X |
|---|---|---|---|---|---|---|---|---|---|---|
| Surfactant 501E |  | 2.50 |  | 2.50 | 2.50 |  | 2.50 | 2.50 | 1.25 | 2.50 |
| COPS I |  | 1.25 |  | 1.25 | 1.25 |  | 1.25 | 1.25 |  | 1.25 |
| Aerosol MA-80* | .275 |  | .275 |  |  |  |  |  |  |  |
| Aerosol 18 |  |  |  |  |  | 3.00 |  |  |  |  |
| Aerosol AY-65 |  |  |  |  |  | 1.50 |  |  |  |  |
| Deionized Water | 52.15 | 68.75 | 52.15 | 68.75 | 68.75 | 67.75 | 68.75 | 48.75 | 43.75 | 68.75 |
| Ammonium Persulfate |  |  |  |  |  | 0.25 |  |  |  |  |
| Ammonium Persulfate | 0.025 | 0.25 | 0.025 | 0.25 | 0.25 | 0.25 | 0.25 | 0.25 | 0.25 | 0.25 |
| Deionized Water | 0.475 | 7.25 | 0.475 | 7.25 | 7.25 | 7.25 | 7.25 | 7.25 | 7.25 | 7.25 |
| Surfactant 501E |  |  |  |  |  |  |  |  | 1.25 |  |
| COPS I |  |  |  |  |  |  |  |  | 1.25 |  |
| Aerosol 22** | .60 |  | .60 |  |  |  |  |  |  |  |
| Aerosol MA-80* | .25 |  | .25 |  |  |  |  |  |  |  |
| Deionized Water | 25.00 |  | 25.00 |  |  |  |  |  | 25.00 |  |
| Hexanediol Diacrylate | 10.50 | 10.00 | 10.50 | 10.00 | 10.00 | 10.00 | 10.00 | 10.00 | 10.00 | 10.00 |
| Methyl Methacrylate |  | 8.00 |  |  |  |  |  | 8.00 |  |  |
| Hydroxypropyl Methacrylate |  |  |  |  |  |  |  |  | 2.00 |  |
| Butyl Acrylate |  |  |  |  |  |  |  |  | 8.00 |  |
| Ethylhexyl Acrylate | 8.40 |  |  |  |  |  |  | 4.20 |  |  |
| Hydroxyethyl Acrylate | 2.10 | 2.00 | 2.10 | 2.00 | 2.00 | 2.00 | 2.00 | 7.00 |  | 2.00 |
| Butyl Methacrylate |  | 8.40 |  |  |  |  |  | 5.00 |  |  |
| Styrene |  |  |  |  |  | 8.00 |  | 5.40 |  |  |
| Ethyl Acrylate |  |  |  |  |  |  |  |  |  | 8.00 |
| Acrylic Acid |  |  |  |  |  |  |  | 0.40 |  |  |
| Methyl Acrylate |  |  |  |  |  |  | 8.00 |  |  |  |
| Isobutyl Acrylate |  |  |  |  |  | 8.00 |  |  |  |  |
| Isobutyl Methacrylate |  |  |  |  | 8.00 |  |  |  |  |  |
| Ammonium Persulfate | .225 |  | .225 |  |  |  |  |  |  |  |
|  | 100.00 | 100.00 | 100.00 | 100.00 | 100.00 | 100.00 | 100.00 | 100.00 | 100.00 | 100.00 |

*Sodium dihexyl sulfosuccinate (American Cyanamid)
**Tetrasosium N-(1,2-dicarboxy-ethyl)-N-octadecyl sulfosuccinamate (American Cyanamid)

TABLE IV

|  | 17 | 18 | 19 | 20 | 21 | 22 | 23 | 24 | 25 | 26 |
|---|---|---|---|---|---|---|---|---|---|---|
| Butanol | 16.44 | 15.32 | 16.44 | 16.44 | 16.44 | 16.44 | 16.44 | 17.88 | 15.32 | 16.44 |
| Cellosolve Acetate | 16.44 | 15.32 | 16.44 | 16.44 | 16.44 | 16.44 | 16.44 | 17.88 | 15.32 | 16.44 |
| Emulsion* | 16.09 | 24.00 | 16.09 | 16.09 | 16.09 | 16.09 | 16.09 | 8.73 | 24.00 | 16.09 |
| tert-Butyl Peroctoate | .67 |  | .67 | .67 | .67 | .67 | .67 | .73 |  | .67 |
| (50% in Mineral Spirits) |  |  |  |  |  |  |  |  |  |  |
| tert-Butyl Perbenzoate |  | .31 |  |  |  |  |  |  | .31 |  |
| n-Dodecyl Mercaptan | 1.61 | 2.00 | 1.61 | 1.61 | 1.61 | 1.61 | 1.61 | 1.75 | 2.0 | 1.61 |
| Styrene | 12.87 | 11.00 | 12.87 | 12.87 | 12.87 | 12.87 | 12.87 | 14.00 | 11.0 | 12.87 |
| Butyl Methacrylate | 10.89 | 10.11 | 10.89 | 10.89 | 10.89 | 10.89 | 10.89 | 11.84 | 10.11 | 10.89 |

TABLE IV-continued

|  | 17 | 18 | 19 | 20 | 21 | 22 | 23 | 24 | 25 | 26 |
|---|---|---|---|---|---|---|---|---|---|---|
| 2-Ethylhexyl Acrylate | 10.24 | 8.45 | 10.24 | 10.24 | 10.24 | 10.24 | 10.24 | 11.14 | 8.45 | 10.24 |
| Hydroxyethyl Acrylate | 8.72 |  | 8.72 | 8.72 | 8.72 | 8.72 | 8.72 | 9.48 |  | 8.72 |
| Acrylic Acid | .92 | .86 | .92 | .92 | .92 | .92 | .92 | 1.00 | .86 | .92 |
| Hydroxypropyl Methacrylate |  | 10.16 |  |  |  |  |  |  | 10.16 |  |
| tert-Butyl Peroctoate (50% in Mineral Spirits) | 4.29 |  | 4.29 | 4.29 | 4.29 | 4.29 | 4.29 | 4.67 |  | 4.29 |
| tert-Butyl Perbenzoate |  | 2.00 |  |  |  |  |  |  | 2.00 |  |
| tert-Butyl Peroctoate (50% in Mineral Spirits) | 0.43 |  | 0.43 | 0.43 | 0.43 | 0.43 | 0.43 | 0.47 |  | 0.43 |
| Butanol | 0.39 |  | 0.39 | 0.39 | 0.39 | 0.39 | 0.39 | 0.43 |  | 0.39 |
| Cellosolve Acetate |  | 0.37 |  |  |  |  |  |  | .37 |  |
| tert-Butyl Perbenzoate |  | 0.10 |  |  |  |  |  |  | .10 |  |
|  | 100.00 | 100.00 | 100.00 | 100.00 | 100.00 | 100.00 | 100.00 | 100.00 | 100.00 | 100.00 |
| *Microgel Emulsion From Table III | I | II | III | IV | V | VI | VII | VIII | IX | X |
| Physical Characteristics |  |  |  |  |  |  |  |  |  |  |
| Non-volatiles | 59.1 | 60.2 | 58.6 | 58.0 | 56.9 | 57.0 | 57.3 | 56.2 | 60.8 | 57.7 |
| Viscosity | H-I | Z | H-I | X | I | H-I | Q | J | V-W | J |
| Acid Number | 20.6 | 40.4 | 20.8 | 19.3 | 18.5 | 17.5 | 19.4 | 17.8 | 32.7 | 19.9 |

EXAMPLE 27

(A) Microgel Emulsion Preparation

| .275% | Aerosol MA-80 |
|---|---|
| 52.150 | Deionized Water |
| .250% | Ammonium persulfate |
| 4.475 | Deionized Water |
| 8.400% | Methyl methacrylate |
| 2.100% | Hydroxypropyl methacrylate |
| 10.000% | 1,6-Hexanediol diacrylate |
| .250% | Aerosol MA-80 |
| .600% | Aerosol 22 |
| 21.500% | Deionized Water |

Procedure:

To a five liter, three neck reaction flask equipped with a condenser, thermometer and agitator, charge the first Aerosol MA-80 and deionized water. Premix the ammonium persulfate and second portion of deionized water and charge to a small addition funnel. A premix of methyl methacrylate, hydroxypropyl methacrylate, 1,6-hexanediol diacrylate, Aerosol MA-80, Aerosol 22, and the third portion of deionized water is prepared and charged to a second addition funnel. This monomer pre-emulsion is held under constant agitation to maintain a uniform mixture. The contents of the reaction flask are heated to 80°±2° C. at which time 10% of the ammonium persulfate solution is added. The monomer pre-emulsion and 80% of the ammonium persulfate solution is added simultaneously and continuously over 2½ hours. The remaining 10% of the ammonium persulfate solution is added over the next 20 minutes. The emulsion is held ½ hour, cooled, and discharged from the flask.

(B) Acrylic Microgel Resin Preparation

| 23.08% | Microgel emulsion (A) |
|---|---|
| 5.79% | n-Butanol |
| 14.40% | Cellosolve Acetate |
| 11.71% | n-Butanol |
| .59% | t-Butyl peroctoate |
| 1.42% | n-Dodecyl mercaptan |
| 3.69% | Styrene |
| 9.57% | Butyl methacrylate |
| 7.69% | Methyl methacrylate |
| 8.96% | 2-Ethylhexyl acrylate |
| 7.96% | Hydroxyethyl acrylate |
| 0.81% | Acrylic acid |
| 3.78% | t-Butyl peroctoate |
| .19% | t-Butyl peroctoate |
| .36% | Cellosolve Acetate |

In a separatory funnel, equipped with an agitator, charge the microgel emulsion and the first n-butanol. Agitate vigorously for five minutes. Allow the mixture to separate into the organic layer and the water n-butanol layer. Discard the water layer and charge the organic layer to the five liter reaction flask.

This coagulated and concentrated emulsion can be used in place of the raw emulsion. The remaining procedure is the same as that used in 1-B.

Paint Preparation and Testing

A silver metal paint was prepared by thoroughly mixing 2.25 parts nonleafing aluminum paste, 0.03 parts lecithin and 2.25 parts xylene. To this mixture was added 1.75 parts acetone, 16.46 parts methylated melamine-formaldehyde resin, and 4.11 parts isobutanol and the resulting mixture was thoroughly mixed.

73.15 parts acrylic microgel resin (adjusted to 55 N.V. with a one to one mixture of n-butanol and Cellosolve Acetate) was added and well mixed. The paint was then reduced to spray viscosity, 25 seconds in a #4 ford Cup, with a one to one mixture of xylene and acetone. The paint was sprayed onto preprimed panels, baked at 265° F. for 20 minutes, and observed for sprayability and aluminum control.

A control paint was prepared in an analogous manner with the solution acrylic resin described in Example 4, the only difference being that this resin did not contain an emulsion of microgel.

The solids, sprayability, and aluminum orientation of the paints prepared in Examples 1 through 27 are tabulated below:

TABLE V

| Example | % Solids By Weight | Sprayability and Aluminum Control |
|---|---|---|
| Control | 46.8 | Poor |

TABLE V-continued

| Example | % Solids By Weight | Sprayability and Aluminum Control |
|---------|--------------------|-----------------------------------|
| 1  | 47.4 | Fair |
| 2  | 45.8 | Good |
| 3  | 43.4 | Fair |
| 4  | 45.0 | Good |
| 5  | 50.0 | Good |
| 6  | 40.2 | Poor |
| 7  | 49.2 | Fair |
| 8  | 48.6 | Good |
| 9  | 48.9 | Good |
| 10 | 48.8 | Very Good |
| 11 | 47.8 | Very Good |
| 12 | 47.0 | Excellent |
| 13 | 49.1 | Excellent |
| 14 | 50.5 | Very Good |
| 15 | 42.4 | Excellent |
| 16 | 44.2 | Good |
| 17 | 52.0 | Fair |
| 18 | 45.4 | Good |
| 19 | 51.7 | Fair |
| 20 | 50.5 | Good |
| 21 | 49.5 | Good |
| 22 | 50.4 | Good |
| 23 | 50.1 | Good |
| 24 | 49.0 | Good |
| 25 | 45.3 | Fair |
| 26 | 46.5 | Fair |
| 27 | 49.5 | Very Good |

Table V illustrates that the aluminum control obtained with the control paint is very poor in comparison to those paints containing microgel emulsion. Poor sprayability and aluminum control were also obtained with the paint of Example 6. This paint contained an emulsion but the emulsion did not contain any crosslinking monomer.

It will be appreciated that various modifications may be made in the invention as described above. Accordingly, the scope of the invention is defined in the following claims wherein:

What is claimed is:

1. A method of making an acrylic microgel resin for use in paint systems to provide coatings of improved pigment orientation and sag resistance which comprises preparing an aqueous microgel emulsion by the emulsion polymerization in water of a mixture of ethylenically unsaturated monomers, at least one of said monomers being an acrylic or methacrylic acid, or an —OH substituted alkyl ester thereof, and containing a —COOH or —OH group, and at least another of said monomers being selected from an alkyl ester of an acrylic or methacrylic acid, styrene and alpha-methyl styrene, and being free from —COOH and —OH groups, and a multifunctional crosslinking agent present in an amount of 5–70 percent by weight of the total weight of said ethylenically unsaturated monomers and crosslinking agent, removing water from the emulsion by coagulation and/or azeotropic distillation with an organic solvent in which the microgel is insoluble and which forms an azeotrope with water, and incorporating the microgel into an acrylic resin prepared by polymerizing two or more ethylenically unsaturated monomers in an organic solvent solution wherein at least one of said monomers is an —OH substituted alkyl ester of an acrylic or methacrylic acid and optionally a monomer containing a —COOH group selected from an acrylic or methacrylic acid, and another of said monomers being selected from an alkyl ester of an acrylic or methacrylic acid, styrene and alpha-methyl styrene, and being free from —COOH and —OH groups to provide said acrylic microgel resin wherein the amount of microgel solids is in the range of 5 to 15 percent by weight of the total resin solids.

2. The method of claim 1 wherein said ethylenically unsaturated monomer containing a —COOH or —OH group used to prepare said aqueous microgel emulsion is selected from acrylic acid, methacrylic acid, hydroxyethyl acrylate, hydroxypropyl acrylate, hydroxyethyl methacrylate and hydroxypropyl methacrylate.

3. The method of claim 1 wherein the amount of ethylenically unsaturated monomer containing said —OH or —COOH groups used in the preparation of said microgel ranges from 10 to 90 weight percent and the amount of said ethylenically unsaturated monomer free from said —OH or —COOH groups ranges from 90 to 10 weight percent.

4. The method of claim 1 wherein the said —OH substituted alkyl ester of acrylic or methacrylic acid employed to prepare said acrylic resin is selected from hydroxyethyl acrylate, hydroxypropyl acrylate, hydroxyethyl methacrylate or hydroxypropyl methacrylate.

5. The method of claim 1 wherein the microgel emulsion is added to the components which are used to prepare the acrylic resin in organic solvent and water in the emulsion is azeotropically distilled concurrently with the preparation of the acrylic resin in the organic solvent.

6. The method of claim 1 wherein the emulsion is first dehydrated and then added to pre-formed acrylic resin in organic solvent.

7. The method of claim 1 wherein the emulsion is added to pre-formed acrylic resin in organic solvent and the emulsion is then dehydrated by azeotropic distillation in the presence of the pre-formed acrylic resin.

8. The method of claim 1 wherein the emulsion is dehydrated to the extent of removing at least 50% by weight of the water, prior to either concurrently preparing the acrylic resin or the addition of the pre-formed acrylic resin and further water removal.

* * * * *